United States Patent [19]

Brandorff et al.

[11] Patent Number: 5,340,950

[45] Date of Patent: Aug. 23, 1994

[54] METHOD AND APPARATUS FOR WEIGHING OBJECTS

[75] Inventors: Alexander Brandorff, New Milford, Conn.; John W. Sussmeier, Wappingers Falls, N.Y.; Steven L. Smith, Oxford, Conn.

[73] Assignee: United Parcel Service of America, Inc., Atlanta, Ga.

[21] Appl. No.: 945,224

[22] Filed: Sep. 15, 1992

[51] Int. Cl.5 .......................................... G01G 19/52
[52] U.S. Cl. ...................................... 177/145; 177/50
[58] Field of Search ................................ 177/145, 50

[56] References Cited

U.S. PATENT DOCUMENTS 2,967,703  1/1961  Jones .
3,180,475  4/1965  Del Rosso .
3,265,140  8/1966  Mayer .
3,299,975  1/1967  Stambera et al. .
3,434,595  3/1969  Seaborn et al. .
3,863,725  2/1975  Raynes .
3,960,225  6/1976  Hyer et al. ........................ 177/50 X
4,260,034  4/1981  Randolph, Jr. .
4,509,609  4/1985  Meiring .
4,611,676  9/1986  Meiring .
4,967,857  11/1990 Kent et al. ........................ 177/145

Primary Examiner—George H. Miller, Jr.
Attorney, Agent, or Firm—Steve Mendelsohn; William H. Murray

[57] ABSTRACT

A method and apparatus for weighing an object in which the object is moved to, and tipped over, a tip point. A signal representative of the weight of the object is generated as the object is tipped over the tip point. The apparatus may include a conveyor for moving the object toward the tip point, which may be supported by a load sensor that generates the signals representative of the object weight.

35 Claims, 5 Drawing Sheets

METHOD AND APPARATUS FOR WEIGHING OBJECTS

FIELD OF THE INVENTION

The present invention relates to weighing objects, and, in particular, to methods and apparatuses for performing in-line weight measurement of packages on conveyor systems.

BACKGROUND OF THE INVENTION

In the field of package shipping, packages are collected from their sources and transported by truck to distribution centers, where they are unloaded onto conveyor systems for processing, sorting, and eventual distribution to their desired destinations. For auditing and billing purposes, the weight of each package is measured. Conventional procedures for weighing packages require manually removing each package from the conveyor, weighing each package on a separate weighing apparatus, and manually replacing each package onto the conveyor. This is a time-consuming operation that requires excessive handling of the packages.

SUMMARY OF THE INVENTION

The present invention comprises a method for weighing an object in which the object is moved to a tip point and tipped over the tip point. A signal representative of the weight of the object is generated as the object is tipped over the tip point.

The present invention also comprises an apparatus for weighing an object. The apparatus comprises means for moving the object from an upstream end toward a downstream end of the moving means. The apparatus further comprises weight-sensing means, positioned at the downstream end of the moving means, for generating a signal representative of the weight of the object as the object tips over the downstream end of the moving means.

In an alternative preferred embodiment, the present invention comprises an apparatus for weighing an object comprising a positively inclined conveyor for supporting and conveying the object from an upstream end toward a downstream end of the conveyor. The apparatus further comprises weight-sensing means, positioned at the downstream end of the conveyor, for generating a signal representative of the weight of the object upon the conveyor, and a negatively inclined receiver for receiving the object from the conveyor.

In a further alternative preferred embodiment, the present invention comprises an apparatus for weighing an object comprising a positively inclined conveyor for supporting and conveying the object from an upstream end toward a downstream end of the conveyor. The apparatus further comprises weight-sensing means, disposed near the downstream end of the conveyor, for receiving the object from the conveyor, supporting the object, and generating a signal representative of the weight of the object; and a negatively inclined receiver for receiving the object from the weight-sensing means.

DETAILED DESCRIPTION OF THE INVENTION

Figure 1:
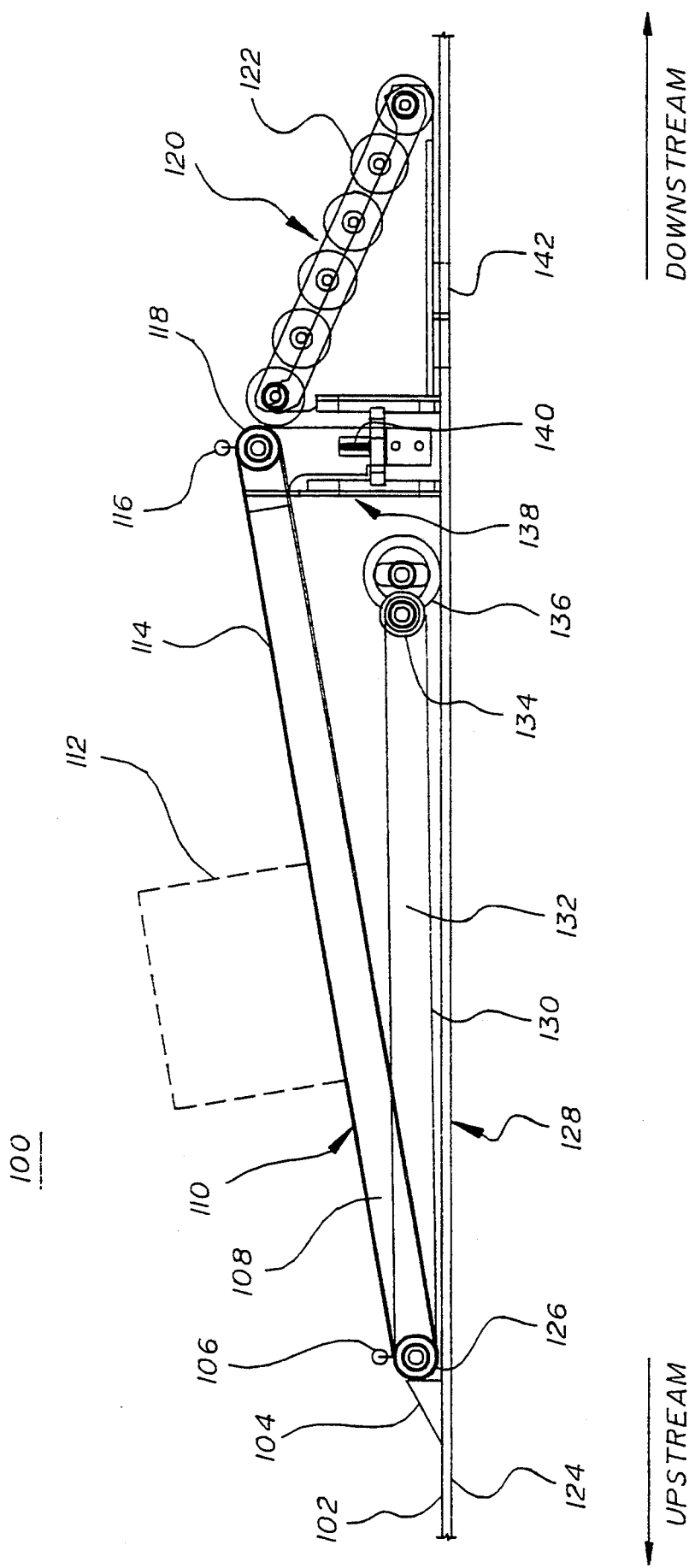
FIG. 1 is a side view in partial cross-section of a preferred embodiment of the present invention for measuring the weight of objects on a conveyor system.

Referring now to FIG. 1, there is shown a preferred embodiment of a weighing apparatus of the present invention generally designated 100. Weighing apparatus 100 comprises an inclined conveyor 110 which is pivotally attached at its upstream end to a timing belt frame 132. The downstream end of inclined conveyor 110 rests upon a load sensor 138. Adjacent to the downstream end of inclined conveyor 110 is receiving conveyor 120. The term "upstream" refers to the direction from which packages arrive at weighing apparatus 100; "downstream" refers to the direction to which packages are directed from weighing apparatus 100. In FIG. 1, upstream is to the left and downstream is to the right.

When weighing apparatus 100 is operating, a package 112 is moved downstream on inclined conveyor 110. Inclined conveyor 110 is positively inclined, having its downstream end higher than its upstream end. The downstream end of inclined conveyor 110 is supported by load sensor 138, which generates signals representative of the weight of objects supported by inclined conveyor 110. As package 112 passes over the downstream end of inclined conveyor 110, package 112 tips from inclined conveyor 110 onto receiving conveyor 120. When package 112 is at this tip point, the entire weight of package 112 is supported by the downstream end of inclined conveyor 110. Signals generated by load sensor 138 when the package is at the tip point are used to determine the weight of package 112. Package 112 tips onto receiving conveyor 120 and proceeds downstream. Receiving conveyor 120 is negatively inclined, having its downstream end lower than its upstream end. Package 112 forms no part of the present invention.

In a preferred embodiment, weighing apparatus 100 is a portable device that may be placed onto conveyor system 128. Conveyor system 128, which forms no part of the present invention, may be a conveyor belt that extends into a tractor trailer for loading and unloading packages. Conveyor system includes conveyor bed 124 and conveyor belt 102. Conveyor bed 124 provide support for weighing apparatus 100, which straddles conveyor belt 102. Magnets 142 on weighing apparatus 100 hold weighing apparatus 100 in place onto metallic conveyor bed 124. Spring-loaded scrub wheels 136 are biased against conveyor belt 102, so that, as conveyor belt 102 moves downstream, conveyor belt 102 drives scrub wheels 136 (counterclockwise in FIG. 1). Scrub wheels 136 drive timing belt 130 supported by timing belt frame 130 (clockwise in FIG. 1) through transmission 134. Timing belt 130 drives upstream roller 126, which in turn drives inclined conveyor belt 114 over and up positively inclined support plate 108 of inclined conveyor 110. Transmission 134, which consists of a set of matched gears (not shown) for speed correction, ensures that the speed of inclined conveyor belt 114 matches the speed of conveyor belt 102. Inclined conveyor belt 114 contains an integral v-belt (not shown)

bonded to its underside that rides in grooves in upstream roller 126 and downstream roller 118 to insure belt tracking.

Load sensor 138, which supports the downstream end of inclined conveyor 110, may include load cell 140, which generates electrical signals representing the weight supported by load sensor 138. These electrical signals are transmitted to a signal processor (not shown) which converts the signals into weight measurements. The upstream end of receiving conveyor 120 is adjacent to and slightly lower than the downstream end of inclined conveyor 110. Receiving conveyor 120 includes passive gravity rollers 122.

In a preferred embodiment, weighing apparatus 100 includes an electrical generator (not shown) for transforming kinetic energy from scrub wheels 136 into electricity. In this preferred embodiment, both the mechanical power for driving the moving components of weighing apparatus 100 and the electrical power for operating the electrical components of weighing apparatus 100 are "picked off" conveyor belt 102 by scrub wheels 136. Weighing apparatus 100 thus requires no independent power source for operation. In an alternative preferred embodiment, weighing apparatus 100 may include a battery (not shown) for powering the electrical components.

As package 112 arrives at weighing apparatus 100 from upstream, nose piece 104 scoops package 112 off conveyor belt 102 onto inclined conveyor belt 114. Inclined conveyor belt 114 moves package 112 up inclined conveyor 110 toward the downstream end of inclined conveyor 110. As package 112 proceeds along inclined conveyor 110, the percentage of the weight of package 112 that is supported at the downstream end of inclined conveyor 110 gradually increases until the center of gravity of package 112 reaches the downstream end. At this tip point, package 112 is momentarily balanced over downstream roller 118 and load sensor 138 supports the entire weight of package 112. The signals generated by load sensor 138 when package 112 is at this tip point are the maximum signals generated for package 112 and are used to determine the weight of package 112.

Package 112 then tips over the downstream end of inclined conveyor 110 and is received onto gravity rollers 122 of receiving conveyor 120, which allows package 112 to return to conveyor belt 102 for continued travel upstream. Receiving conveyor 120 is vibrationally isolated from inclined conveyor 110 to minimize any mechanical noise after package 112 has been weighed. Since weighing apparatus 100 weighs packages as they tip over the downstream end of inclined conveyor 110, weighing apparatus 100 can weigh packages that are larger than weighing apparatus 100.

The signal processor (not shown) receives, analyzes, and processes signals from load sensor 138 to determine the weight of package 112. Since load sensor 138 supports both package 112 and inclined conveyor 110, the tare weight of inclined conveyor 110 is subtracted from the load sensor signals to generate net load signals representative of the force exerted by package 112 onto load sensor 138. Because load sensor 138 is not mechanically isolated from inclined conveyor 110 or from receiving conveyor 120, the net load signals contain noise and are therefore preferably filtered by the signal processor in determining the weight of package 112.

Figure 5:
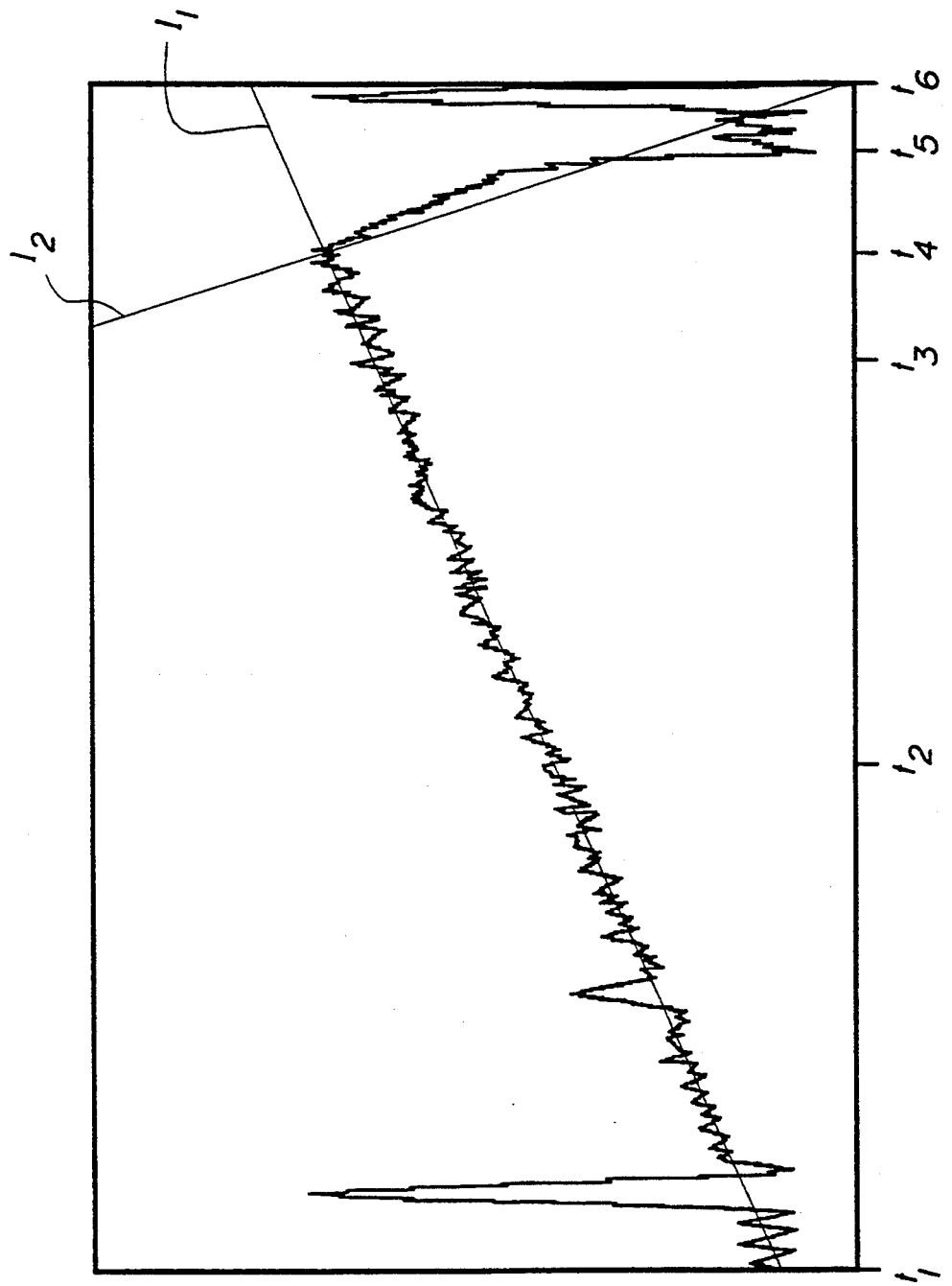
FIG. 5 is a graphical representation of the load sensor signals as a function of time as a package is weighed.

Referring now to FIG. 5, there is shown a graphical representation of the signals generated by load sensor 138 as a function of time for package 112. Prior to time $t_1$, package 112 begins to enter inclined conveyor 110 at nose piece 104. As package 112 proceeds along and up inclined conveyor 110 towards the tip point, the signals generated by load sensor 138 increase as the force exerted by package 112 onto load sensor 138 increases. Near time $t_4$, package 112 reaches the tip point. The signals generated by load sensor 138 then begin to decrease, as package 112 falls onto receiving conveyor 120.

In order to compensate for the signal noise, the following preferred two-line least-squares fit analysis is implemented. Load sensor signals are continuously sampled, for example, every 2 milliseconds. Each sampled signal corresponds to a value representing the tare weight of inclined conveyor 110 plus the force exerted by package 112 onto load sensor 138. After sampling n consecutive values with magnitudes greater than a specified threshold, the sampled signals are stored. In a preferred embodiment, n is 20 and the specified threshold is one pound greater than the scale tare weight. Thus, storage of sampled signals preferably begins as soon as 20 consecutive signals greater than 1 pound above the scale tare weight are sampled. This is represented as time $t_1$ in FIG. 5. The sampled signals are stored until 20 consecutive signals less than the specified threshold are sampled, represented as time $t_6$.

After collecting the signals, the raw signal data is digitally processed through a software low-pass filter to remove high-frequency noise spikes. The peak value of the filtered data is identified as corresponding to the approximate time (time $t_4$) when the tip occurred. In FIG. 5, time $t_2$ represents the point in time half way between time $t_1$ and time $t_4$, and time $t_3$ represents the 90% point in that time interval. Time $t_5$ represents the point in time when the filtered signal value falls to 50% of the peak value at time $t_4$. A least-squares fit is performed on the raw signal data between times $t_2$ and $t_3$ to generate a first line $l_1$. Similarly, a least-squares fit is performed on the raw signal data between times $t_4$ and $t_5$ to generate a second line $l_2$. The point where lines $l_1$ and $l_2$ intersect is then selected to represent the weight of package 112 (after subtracting the scale tare weight).

By using this two-line least-squares fit analysis, the weight of package 112 can be determined avoiding the disadvantages associated with conventional methods for determining package weights. With conventional scales, the full weight of the package is typically on the scale for a relatively long period of time (i.e., seconds). In such case, it is possible to pass the signal from the weight sensor through a very low-pass filter, or simply to sample the signal digitally and average the data over a period of time, or a combination of both.

Such conventional methods present difficulties for weighing apparatus 100 of the present invention. Averaging is not feasible since the force on load sensor 138 is constantly changing, first increasing as package 112 climbs inclined conveyor 110, then decreasing after it reaches the tip point. The full weight of package 112 is carried by load sensor 138 only very briefly (approximately 20 milliseconds for an average rigid package).

Low-pass filtering may be used to filter out a large portion of the noise. However, the filter needs to be very low-pass in order to filter out the noise associated with conveyor systems. Such a very low-pass filter tends to decrease the signals corresponding to the tip point, which occurs relatively quickly. The result is a scale that tends to weigh low. This can be compensated for by performing a dynamic calibration in which a known weight is run over the scale and then determining an adjustment factor from the decreased signal generated for the known weight. This adjustment factor can then be applied during operation of the scale. One major drawback to this system is that the adjustment factor varies with the speed of the conveyor system.

Another disadvantage of the conventional low-pass filter is that the scale would generate different weight values for two packages with the same weight but different size. The longer package would tend to weigh heavier than the shorter package, because the load sensor signals generated for the longer package would rise more gradually, resulting in less signal phase shift and attenuation upon filtering.

The preferred two-line least-squares fit analysis avoids these problems associated with conventional low-pass filtering typically used in conjunction with conventional scales. Those skilled in the art will understand that alternative embodiments of the two-line least-squares fit analysis of the present invention may be based on sets of signal data other than those specifically described. It will also be understood that the signal processor of the present invention may implement these preferred algorithms in either software or hardware.

In a preferred embodiment, photoswitches 106 and 116 of weighing apparatus 100 provide the capability for measuring the weight of non-rigid packages, such as bags, as well as rigid packages. When photoswitch 106 indicates that a non-rigid package is completely on weighing apparatus 100, the output of load sensor 138 is measured. The output of load sensor 138 is again measured when the non-rigid package just reaches the downstream end of weighing apparatus 100 as indicated by photoswitch 116. The package weight and the location of the package center of gravity may then be calculated.

Figure 2:
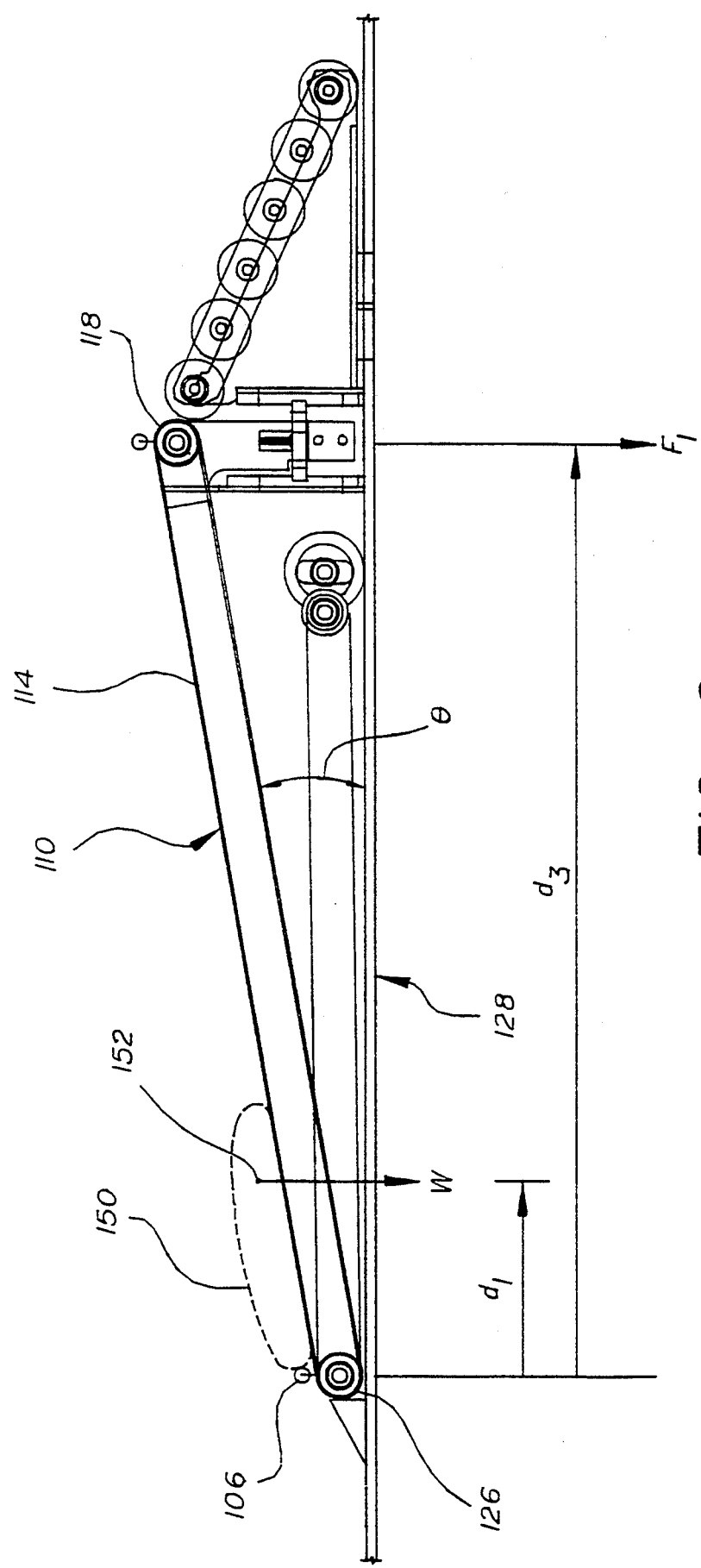
FIGS. 2 and 3 are shown cross-section side views of the preferred embodiment of FIG. 1 demonstrating a method of weighing non-rigid packages.
Figure 3:
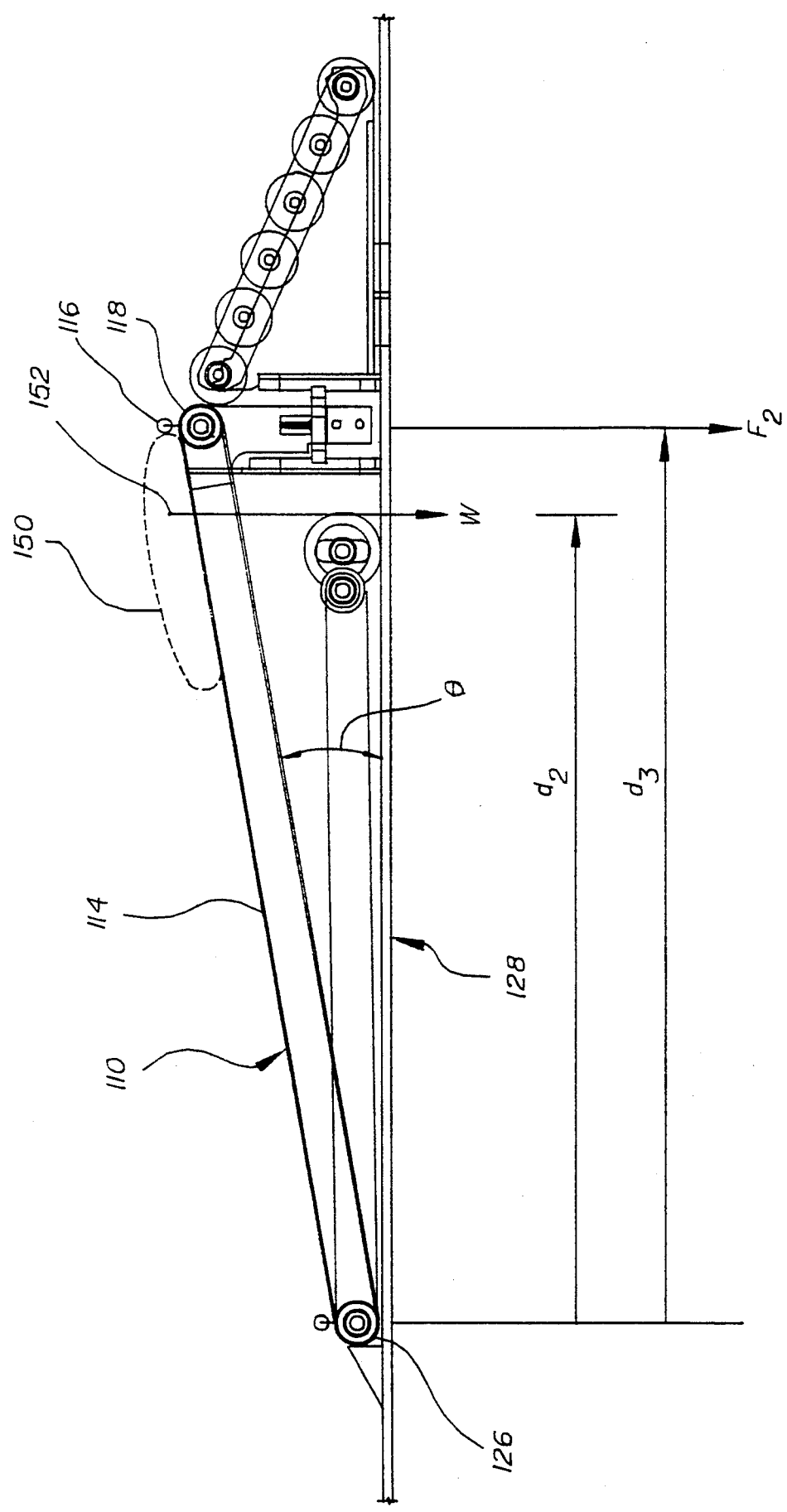

Referring now to FIGS. 2 and 3, there are shown cross-section side views of weighing apparatus 100 that demonstrate the method of weighing non-rigid packages. At time $t_1$, as presented in FIG. 2, photoswitch 106 indicates that non-rigid package 150 is completely on weighing apparatus 100. At this time, the center of gravity 152 of package 150 is a horizontal distance $d_1$ from upstream roller 126. At time $t_1$, the first load sensor reading $F_1$ is recorded, such that:

$$W \times d_1 = F_1 \times d_3, \qquad (1)$$

where W is the weight of package 150 and $d_3$ is the horizontal distance from upstream roller 126 to load sensor 138.

At time $t_2$, as presented in FIG. 3, photoswitch 116 indicates that non-rigid package 150 has just reached the downstream end of weighing apparatus 100. At this time, the center of gravity 152 of package 150 is a horizontal distance from upstream roller 126. At time $t_2$, the second load sensor reading $F_2$ is recorded, such that:

$$W \times d_2 = F_2 \times d_3. \qquad (2)$$

The measured duration $\Delta t$ between times $t_1$ and $t_2$ is related to the horizontal distances $d_1$ and $d_2$ by:

$$d_2 - d_1 = v \cdot \Delta t \cdot \cos\theta, \qquad (3)$$

where v is the known velocity of inclined conveyor belt 114 and $\theta$ is the inclination angle between conveyor system 128 and inclined conveyor 110.

Solving the three equations (1), (2), and (3) for the three unknowns W, $d_1$, and $d_2$ yields:

$$W = \frac{d_3 (F_2 - F_1)}{v \cdot \Delta t \cdot \cos\theta}, \qquad (4)$$

$$d_1 = \frac{v \cdot \Delta t \cdot \cos\theta \cdot F_1}{F_2 - F_1}, \qquad (5)$$

and $$d_2 = \frac{F_2 d_1}{F_1}. \qquad (6)$$

Figure 4:
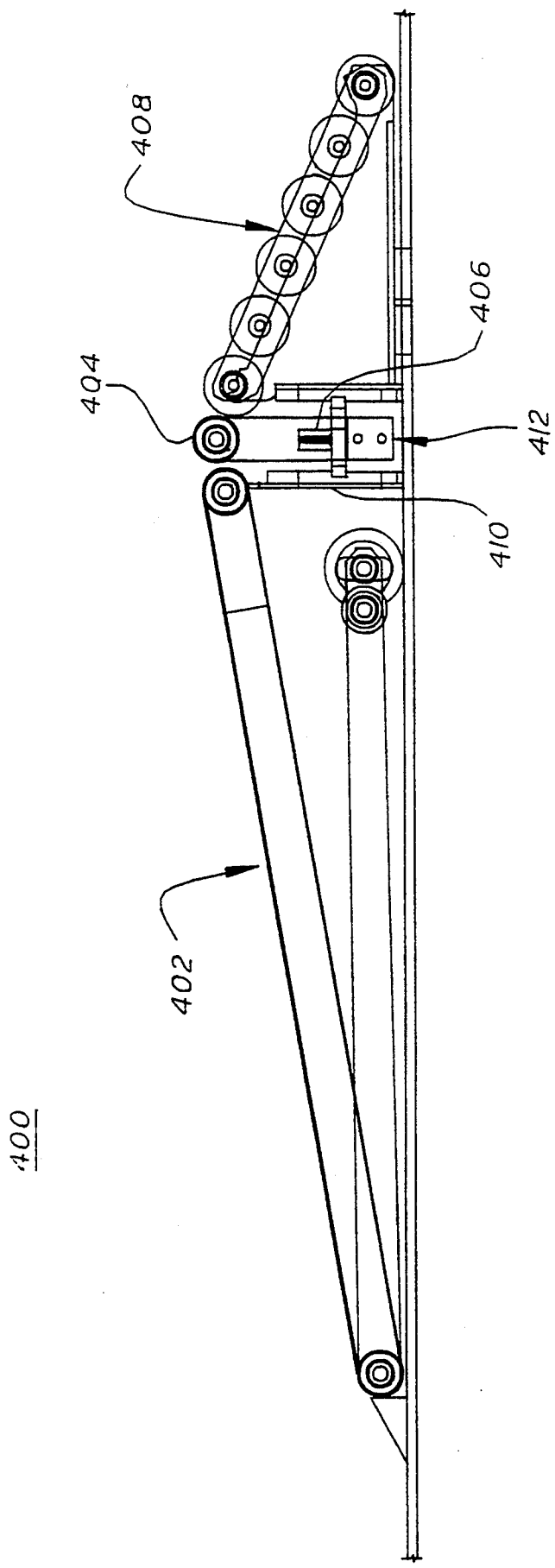
FIG. 4 is a side view in partial cross-section of an alternative preferred embodiment of the present invention for measuring the weight of objects on a conveyor system.

Referring now to FIG. 4, there is shown a cross-section side view of weighing apparatus 400, an alternative embodiment of the present invention. Weighing apparatus 400 differs from weighing apparatus 100 of FIG. 1 in that inclined conveyor 402 is supported by support 410 instead of by load sensor 412. Load sensor 412 includes weighing roller 404, which is supported by two load cells 406. A package is weighed as it tips from inclined conveyor 402, over weighing roller 404, and onto receiving conveyor 408. Since load sensor 412 does not support inclined conveyor 402, little or no space is required between packages.

It will be understood by those skilled in the art that the present invention need not be portable, but rather may form an integral, permanent part of a conveyor system. Those skilled in the art will also understand that the present invention is not limited to conveyor systems. Any means of moving a package to a tip point is within the scope of the present invention. Moreover, the means for moving a package need not be positively inclined. For example, another preferred embodiment of the present invention comprises a negatively inclined chute that is supported at its lower end by a load sensor of some type. Packages may slide under the influence of gravity down the chute to a tip point at the end of the chute. As a package tips over the end of the chute, the load sensor measures the weight of the package. This embodiment may or may not comprise separate means for receiving a package after it leaves the chute.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for weighing an object, comprising the steps of:
   (a) moving the object to a tip point;
   (b) tipping the object over said tip point;
   (c) generating a first signal representative of the weight of the object before the object reaches said tip point;
   (d) generating a first line in accordance with said first signal;
   (e) generating a second signal representative of the weight of the object after the object reaches said tip point;
   (f) generating a second line in accordance with said second signal; and (g) determining the weight of the object in accordance with the intersection point of said first and second lines.

2. The method of claim 1, wherein:
step (c) comprises the step of generating a first plurality of signals representative of the weight of the object before the object reaches said tip point;
step (d) comprises the step of generating said first line in accordance with said first plurality of signals;
step (e) comprises the step of generating a second plurality of signals representative of the weight of the object after the object reaches said tip point; and
step (f) comprises the step of generating said second line in accordance with said second plurality of signals.

3. The method of claim 2, wherein:
step (d) comprises the step of generating said first line in accordance with a least-squares fit analysis; and
step (f) comprises the step of generating said second line in accordance with a least-squares fit analysis.

4. An apparatus for weighing an object, comprising:
(a) means for moving the object from an upstream end toward a downstream end of said moving means;
(b) weight-sensing means, positioned at the downstream end of said moving means, for generating a signal representative of the weight of the object as the object tips over the downstream end of said moving means; and
(c) a receiver for receiving the object from said moving means, said receiver having an upstream end disposed near the downstream end of said moving means, wherein said receiver is vibrationally isolated from said weight-sensing means.

5. The apparatus of claim 4, wherein said apparatus is placed on top of a conveyor system, said moving means further comprising means, biased against said conveyor system, for driving said moving means.

6. The apparatus of claim 5, wherein said driving means generates electrical energy to power said weight-sensing means.

7. An apparatus for weighing an object, comprising:
(a) a positively inclined conveyor for supporting and conveying the object from an upstream end toward a downstream end of said conveyor;
(b) weight-sensing means, positioned at the downstream end of said conveyor, for generating a signal representative of the weight of the object upon said conveyor; and
(c) a negatively inclined receiver for receiving the object from said conveyor, wherein said apparatus is placed on top of a conveyor system, said positively inclined conveyor further comprising means, biased against said conveyor system, for driving said positively inclined conveyor.

8. The apparatus of claim 7, wherein said receiver is vibrationally isolated from said weight-sensing means.

9. The apparatus of claim 7, wherein said driving means generates electrical energy to power said weight-sensing means.

10. An apparatus for weighing an object, comprising:
(a) a positively inclined conveyor for supporting and conveying the object from an upstream end toward a downstream end of said conveyor;
(b) weight-sensing means, disposed near the downstream end of said conveyor, for receiving the object from said conveyor, supporting the object, and generating a signal representative of the weight of the object; and
(c) a negatively inclined receiver for receiving the object from said weight-sensing means, wherein said receiver is vibrationally isolated from said weight-sensing means.

11. The apparatus of claim 10, wherein said apparatus is placed on top of a conveyor system, said positively inclined conveyor further comprising means, biased against said conveyor system, for driving said positively inclined conveyor.

12. The apparatus of claim 11, wherein said driving means generates electrical energy to power said weight-sensing means.

13. An apparatus for weighing an object, comprising:
(a) means for moving the object to a tip point;
(b) means for tipping the object over said tip point;
(c) means for generating a first signal representative of the weight of the object before the object reaches said tip point;
(d) means for generating a first line in accordance with said first signal;
(e) means for generating a second signal representative of the weight of the object after the object reaches said tip point;
(f) means for generating a second line in accordance with said second signal; and
(g) means for determining the weight of the object in accordance with the intersection point of said first and second lines.

14. The apparatus of claim 13, wherein:
means (c) comprises means for generating a first plurality of signals representative of the weight of the object before the object reaches said tip point;
means (d) comprises means for generating said first line in accordance with said first plurality of signals;
means (e) comprises means for generating a second plurality of signals representative of the weight of the object after the object reaches said tip point; and
means (f) comprises means for generating said second line in accordance with said second plurality of signals.

15. The apparatus of claim 14, wherein:
means (d) comprises means for generating said first line in accordance with a least-squares fit analysis; and
means (f) comprises means for generating said second line in accordance with a least-squares fit analysis.

16. A method for weighing a non-rigid object, comprising the steps of:
(a) moving the non-rigid object along an inclined conveyor supported near the elevated end by a weight-sensing means;
(b) generating a first weight signal with said weight-sensing means, said first weight signal being representative of the weight of the non-rigid object when the non-rigid object is at a first position along said conveyor;
(c) generating a second weight signal with said weight-sensing means, said second weight signal being representative of the weight of the non-rigid object when the non-rigid object is at a second position along said conveyor; and
(d) determining the weight of the non-rigid object in accordance with said first and second weight signals.

17. The method of claim 16, further comprising the steps of:
   (e) generating a first position signal indicating that said non-rigid object is at said first position; and
   (f) generating a second position signal indicating that said non-rigid object is at said second position.

18. The method of claim 16, further comprising the steps of:
   (e) placing said conveyor on top of a conveyor system; and
   (f) driving said conveyor with said conveyor system, said conveyor comprising driving means, biased against said conveyor system, for driving said conveyor.

19. An apparatus for weighing a non-rigid object, comprising:
   (a) an inclined conveyor for moving the non-rigid object;
   (b) a weight-sensing means, supporting said conveyor near the elevated end, for generating a first weight signal representative of the wight of the non-rigid object when the non-rigid object is at a first position along said conveyor and for generating a second weight signal representative of the weight of the non-rigid object when the non-rigid object is at a second position along said conveyor; and
   (c) means for determining the weight of the non-rigid object in accordance with said first and second weight signals.

20. The apparatus of claim 19, further comprising:
   (d) means for generating a first position signal indicating that said non-rigid object is at said first position; and
   (e) means for generating a second position signal indicating that said non-rigid object is at said second position.

21. The apparatus of claim 19, wherein said conveyor is placed on top of a conveyor system and said conveyor comprises driving means, biased against said conveyor system, for driving said conveyor.

22. An apparatus for weighing an object, comprising:
   (a) means for moving the object from an upstream end toward a downstream end of said moving means; and
   (b) weight-sensing means, positioned at the downstream end of said moving means, for generating a signal representative of the wight of the object as the object tips over the downstream end of said moving means, wherein said apparatus is placed on top of a conveyor system, said moving means further comprising means, biased against said conveyor system, for driving said moving means.

23. The apparatus of claim 22, wherein said driving means generates electrical energy to power said weight-sensing means.

24. The apparatus of claim 22, further comprising a receiver for receiving the object from said moving means, said receiver having an upstream end disposed near the downstream end of said moving means, wherein said receiver is vibrationally isolated from said weight-sensing means.

25. The apparatus of claim 22, wherein said moving means comprises:
   (1) a conveyor belt for moving the object from said upstream end toward said downstream end;
   (2) means for securing said apparatus to a static portion of said conveyor system;
   (3) scrub wheels biased against a moving portion of said conveyor system, wherein said moving portion rotatably drives said scrub wheels; and
   (4) a timing belt for transferring the rotation of said scrub wheels to the motion of said conveyor belt.

26. An apparatus for weighing an object, comprising:
   (a) a positively inclined conveyor for supporting and conveying the object from an upstream end toward a downstream end of said conveyor;
   (b) weight-sensing means, disposed near the downstream end of said conveyor, for receiving the object from said conveyor, supporting the object, and generating a signal representative of the weight of the object; and
   (c) a negatively inclined receiver for receiving the object from said weight-sensing means, wherein said apparatus is placed on top of a conveyor system, said positively inclined conveyor further comprising means, biased against said conveyor system, for driving said positively inclined conveyor.

27. The apparatus of claim 26, wherein said receiver is vibrationally isolated from said weight-sensing means.

28. The apparatus of claim 26, wherein said driving means generates electrical energy to power said weight-sensing means.

29. The apparatus of claim 26, wherein said conveyor comprises:
   (1) a conveyor belt for moving the object from said upstream end toward said downstream end;
   (2) means for securing said apparatus to a static portion of said conveyor system;
   (3) scrub wheels biased against a moving portion of said conveyor system, wherein said moving portion rotatably drives said scrub wheels; and
   (4) a timing belt for transferring the rotation of said scrub wheels to the motion of said conveyor belt.

30. A method for weighing a non-rigid object, comprising the steps of:
   (a) placing a conveyor supported by a weight-sensing means on top of a conveyor system;
   (b) driving said conveyor with said conveyor system, said conveyor comprising driving means, biased against said conveyor system, for driving said conveyor;
   (c) moving the non-rigid object along said conveyor;
   (d) generating a first weight signal with said weight-sensing means, said first weight signal being representative of the weight of the non-rigid object when the non-rigid object is at a first position along said conveyor;
   (e) generating a second weight signal with said weight-sensing means, said second weight signal being representative of the wight of the non-rigid object when the non-rigid object is at a second position along said conveyor; and
   (f) determining the weight of the non-rigid object in accordance with said first and second weight signals.

31. The method of claim 30, further comprising the steps of:
   (g) generating a first position signal indicating that said non-rigid object is at said first position; and
   (h) generating a second position signal indicating that said non-rigid object is at said second position.

32. The method of claim 30, wherein said conveyor comprises an inclined conveyor supported near the elevated end by said weight-sensing means.

33. An apparatus for weighing a non-rigid object, comprising:
(a) a conveyor for moving the non-rigid object, wherein said conveyor is placed on top of a conveyor system and said conveyor comprises driving means, biased against said conveyor system, for driving said conveyor;
(b) a weight-sensing means, supporting said conveyor, for generating a first weight signal representative of the weight of the non-rigid object when the non-rigid object is at a first position along said conveyor and for generating a second weight signal representative of the weight of the non-rigid object when the non-rigid object is at a second position along said conveyor; and
(c) means for determining the weight of the non-rigid object in accordance with said first and second weight signals.

34. The apparatus of claim 33, further comprising:
(d) means for generating a first position signal indicating that said non-rigid object is at said first position; and
(e) means for generating a second position signal indicating that said non-rigid object is at said second position.

35. The apparatus of claim 33, wherein said conveyor comprises an inclined conveyor supported near the elevated end by said weight-sensing means.

* * * * *

UNITED STATES PATENT AND TRADEMARK OFFICE
CERTIFICATE OF CORRECTION

PATENT NO. : 5,340,950

DATED : August 23, 1994

INVENTOR(S) : Alexander Brandorff, John W. Sussmeier, and Steven L. Smith

It is certified that error appears in the above-indentified patent and that said Letters Patent is hereby corrected as shown below:

Column 9, line 21, delete "wight" and insert therefor --weight--.

Column 9, line 48, delete "wight" and insert therefor --weight--.

Column 10, line 54, delete "wight" and insert therefor --weight--.

Signed and Sealed this

Fourth Day of July, 1995

Attest:

BRUCE LEHMAN

Attesting Officer     Commissioner of Patents and Trademarks